(12) United States Patent
Schmidt et al.

(10) Patent No.: US 6,409,224 B1
(45) Date of Patent: Jun. 25, 2002

(54) FASTENING MEANS

(75) Inventors: Robert Schmidt, Steinen; Berthold Laurinat, Lörrach, both of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/584,322

(22) Filed: May 31, 2000

Related U.S. Application Data

(60) Provisional application No. 60/145,301, filed on Jul. 23, 1999.

(30) Foreign Application Priority Data

Jul. 23, 1999 (EP) .............................................. 99114526

(51) Int. Cl.⁷ .............................................. F16L 39/00
(52) U.S. Cl. ................................ 285/124.3; 285/124.4; 411/92
(58) Field of Search ........................... 285/124.3, 124.4, 285/124.5; 411/87, 90, 92

(56) References Cited

U.S. PATENT DOCUMENTS

| | | |
|---|---|---|
| 2,779,094 A | 1/1957 | Christoffel |
| 3,944,264 A * | 3/1976 | Mong et al. ............. 285/124.4 |
| 4,346,734 A * | 8/1982 | Frank ........................ 411/92 X |
| 4,893,975 A * | 1/1990 | Anthony .................... 411/92 X |
| 5,429,465 A * | 7/1995 | Puskas ........................ 411/92 |

FOREIGN PATENT DOCUMENTS

FR            1.151.117          1/1958

* cited by examiner

*Primary Examiner*—Neill Wilson
(74) *Attorney, Agent, or Firm*—Bose McKinney & Evans LLP

(57) ABSTRACT

A fastening means (7) is proposed for bushings of all types on housings (1), in particular plastic housings, on which at least two bushings (2a, 2b) are formed on in the form of short, hollow-cylindrical projections, which permit accesses into the housing interior and on which various lines, such as supply lines and/or signal lines and the like for an item of equipment located in the housing (1), are fastened by means of adapters (5a, 5b) fastened there.

The fastening means (7) comprises a sheet-like base plate (8) in which openings are provided, the inner surfaces of which are shaped in such a way that the base plate (8) fits on all the adapters (5a, 5b) and in this way connects them to one another and braces them against one another. This achieves the effect that, when screwing in and tightening cable connections or connections of other lines into the adapters (5), overstressing of the connection of the adapters (5a, 5b) to the housing (1) is avoided.

55 Claims, 3 Drawing Sheets

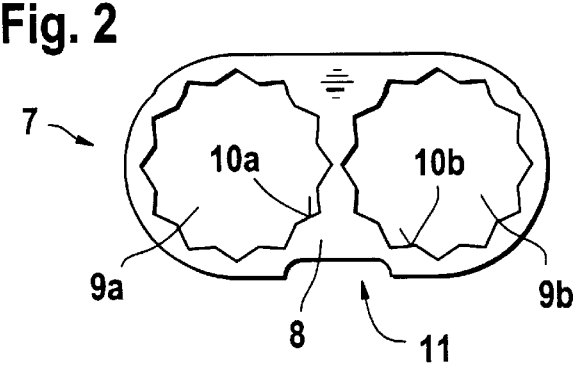
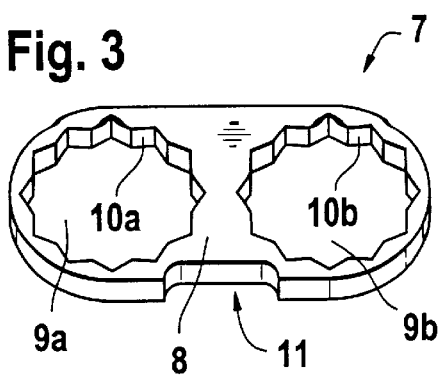
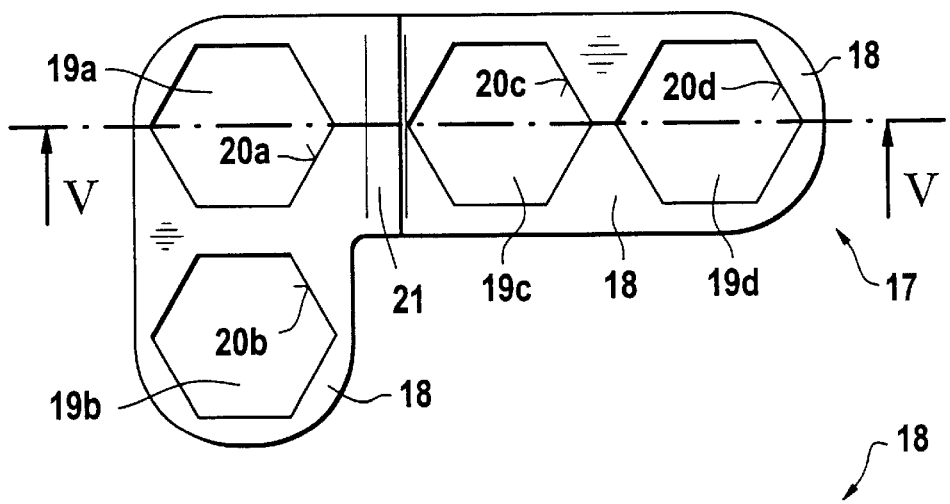
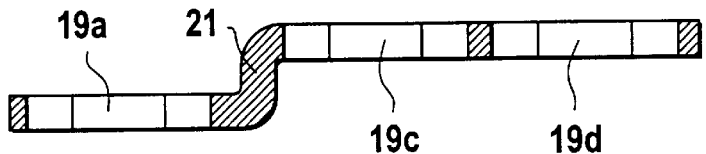
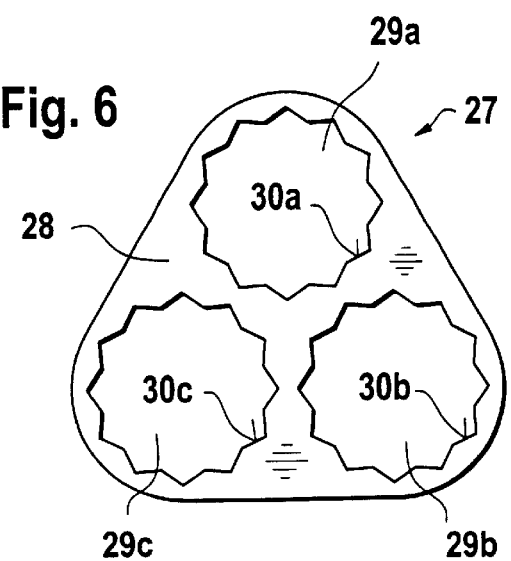
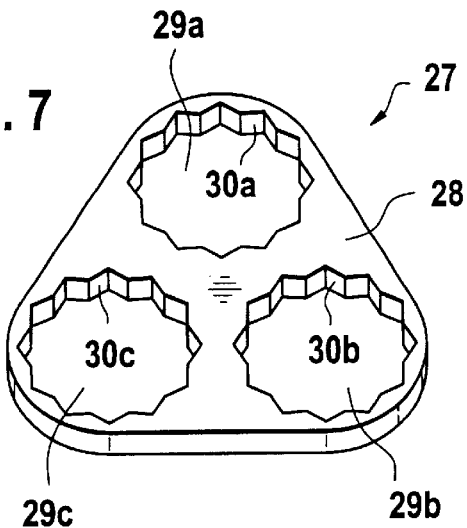

FASTENING MEANS

This application claims priority from provisional application Ser. No. 60/145,301, filed Jul. 23, 1999.

FIELD OF THE INVENTION

The invention relates to a fastening means for adapters, in particular cable entries, in wall openings of housings of a wide variety of items of equipment.

BACKGROUND

Housings of many of such items of equipment are provided in their housing walls with openings or else lead-through eyes which are formed onto and into the housing walls and serve for leading through lines of a wide variety of types, for example electrical supply lines, signal lines or else pressure-medium lines etc., and for bringing these lines up to and connecting them to items of equipment accommodated in such housings. For the sake of simplicity, the openings or lead-through eyes mentioned are referred to in the following generically as "bushings".

The lines may themselves be conduits or be led up to the housings in conduits or sheaths, for example cable sheaths, and be fastened to the housings in cable entries, threaded adapters of a general type, or else stoppers, referred to in the following as "adapters". The adapters themselves are screwed, welded and/or adhesively bonded into the bushings. The housings can consequently be used independently of different thread standards of the conduit, sheath or cable connections and, if required, permit the transition from one type of thread, for example an armored thread or metric thread, to another type of thread, for example an imperial thread.

To allow the items of equipment to be manufactured as inexpensively as possible, the housings are today produced from a suitable plastic, for example by the injection-molding process. The adapters, on the other hand, are often manufactured from metal, since they are intended to establish the connection with the usually metallic conduit and sheath connections. On account of the different materials, correspondingly high mechanical stressing of the adapters can lead to deformation of the thin housing wall, consisting of plastic, and to failure of the connection between adapter and housing. A similarly undesired effect may also occur if cable or conduit connections are screwed into threaded adapters screwed in advance into the bushings of the housing and tightened with the aid of a tool. If the plastic at the connecting point is overstressed, the threaded adapter tears out, with the result that particularly thin-walled housings of plastic often do not meet prescribed test or certification criteria.

For example, the US test authority "FM" (Factury Mutual) requires of equipment in which only one line is led through a single bushing with a common ¾" adapter connection, or smaller, that, in a so-called "torque test", the housing is not damaged and that the threaded adapter must not be torn out at a tightening or breakaway torque of 90 Nm. For equipment with an adapter connection of up to 1.5", resistance to as much as 113 Nm is required. The relevant US authority FM also requires for the equipment mentioned that, in a so-called "bending test", adapter connections with a connection of up to ¾" with respect to the housing withstand a bending torque of 34 Nm unimpaired; for metallic adapters with a connection from 1", resistance to as much as 68 Nm is required.

These loads can currently only sometimes be met in the case of plastic housings, by the adapters being adhesively bonded very accurately in the bushings of the housing. Adhesive bonds of this type are, however, complex and consequently expensive. Tests have shown, however, that adhesive bonds of this type fail under loads on the adapters at torques of 90 Nm, as mentioned above.

SUMMARY OF THE INVENTION

It is an object of the invention to provide a fastening means with which adapters, in particular threaded adapters, for lines of all types are fastened to the provided bushings of a housing in such a way that the connection does not fail under high loads, in particular complies with the loading tests prescribed by test authorities, even in the case of thin-walled plastic housings, wherever possible without the need for the adapters to be additionally adhesively bonded in the bushings.

This object is achieved according to the invention by a fastening means for adapters and bushings on housings, in particular housings with a wall of small thickness, in which at least two bushings ($2a$, $2b$) are provided, which permit accesses into the housing interior and with, on or in which lines, such as for example signal lines, supply lines or conduits or the like for an item of equipment located in the housing, are fastened by adapters; the fastening means comprising a base plate with at least two openings, which correspond in shape and arrangement to the adapters and the inner surfaces of which are shaped in such a way that the base plate fits positively onto the adapters and the latter are positively braced with respect to one another.

According to another variant of the invention, this object is achieved by fastening means for adapters and bushings on housings, in particular housings with a wall of small thickness, in which at least one bushing is provided, which permits access into the housing interior and with, on or in which a line, such as for example a signal line, a supply line or a conduit or the like for an item of equipment located in the housing, is fastened by means of at least one adapter; the fastening means comprising a base plate with at least one opening, which corresponds in shape and arrangement to the adapter and the inner surface of which is shaped in such a way that the base plate fits positively onto the adapter and the latter is positively braced with respect to the housing by means of at least one securing or bracing element.

In a preferred embodiment of the invention, it is provided that, in the case of housings with adapters which are screwed into the bushing or bushings and respectively have a polygonal external shape, preferably a hexagonal external shape, the respective inner surface of the openings in the base plate of the fastening means is designed as a triangular, hexagonal or dodecagonal shape fitting positively onto the adapters.

According to other preferred embodiments of the invention with more than two openings, the said openings lie in a row on a common line and/or, in the case of an angled plate as the base plate with more than two openings, the openings lie on at least two lines running at an angle, preferably a right angle, with respect to one another.

According to a further embodiment of the invention, the base plate or angled plate has for adaptation to the contour of a housing wall at least one angled-away portion, so that the openings lie in at least two different planes.

According to another embodiment of the invention, the base plate has the shape of an equilateral triangle with rounded-off corners, an opening lying in each corner.

Other embodiments again of the invention relate to a base plate which consists of a glass-fiber-reinforced plastic or of a metal sheet, preferably of stainless steel.

In a further embodiment of the fastening means according to the invention, the securing or bracing element is a specially shaped recess of the base plate into which a corresponding projection of the housing acts in an engaging or positive manner.

According to another embodiment, the securing or bracing element comprises at least one cranked projection which is formed onto the base plate and interacts with a corresponding abutment of the housing.

The invention is based on the idea that, when fitting the fastening means according to the invention onto the adapters fastened in the bushings, in particular screwed in there and aligned by turning, they are connected to one another in such a way that, when screwing in and tightening cable connections or other lines into the adapters, overstressing of the adapter connections, in particular threaded connections, is avoided and consequently possible breaking out of the adapters is avoided. The torque acting during tightening of the line connections is converted into a more favorable bending load.

A further particular advantage of a fastening means according to the invention produced from a metal sheet is that differences in potential occurring at the connections are equalized, which leads to greater safety for the equipment.

In addition, fastening means can be manufactured from a metal sheet or from plastic in a simple and low-cost way, for example by laser cutting.

BRIEF DESCRIPTION OF THE DRAWINGS

The invention is described in more detail below with reference to the attached drawing. For reasons of simplification, components, elements or groups which are the same in form and function are provided where applicable with the same designations. In the drawing:

FIG. 1b shows an exploded representation of the housing and the fastening means according to FIG. 1a;

FIG. 2 shows a plan view of the fastening means according to FIG. 1;

FIG. 3 shows the fastening means according to FIG. 2 in a perspective representation;

FIG. 4 shows a plan view of a second embodiment of the fastening means according to the invention;

FIG. 5 shows a sectional representation of the fastening means according to FIG. 4 along the sectional line V—V in FIG. 4;

FIG. 6 shows a plan view of a third embodiment of the fastening means according to the invention;

FIG. 7 shows a perspective representation of the fastening means according to FIG. 6;

DETAILED DESCRIPTION OF EXEMPLARY EMBODIMENTS

Figure 1A:
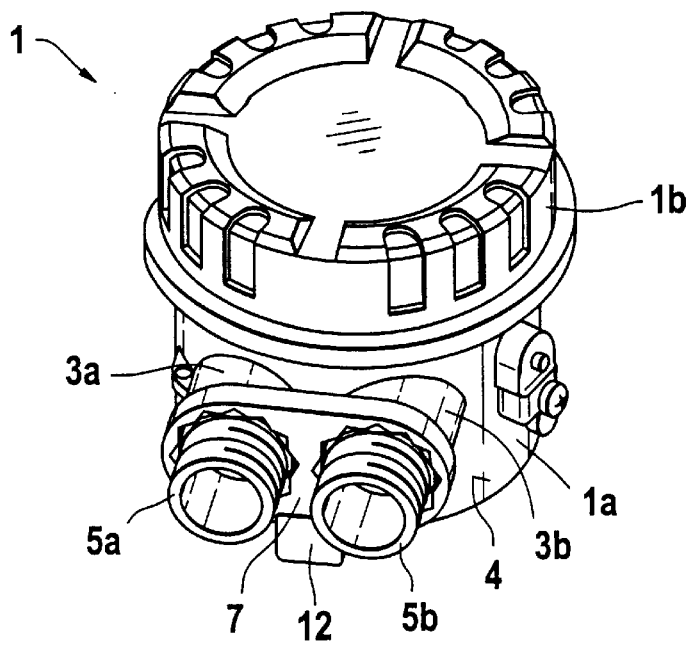
FIG. 1a shows in a perspective view a housing of an item of equipment with a first embodiment of the fastening means according to the invention at two screw connection points for the leading in or through of lines.
Figure 1B:
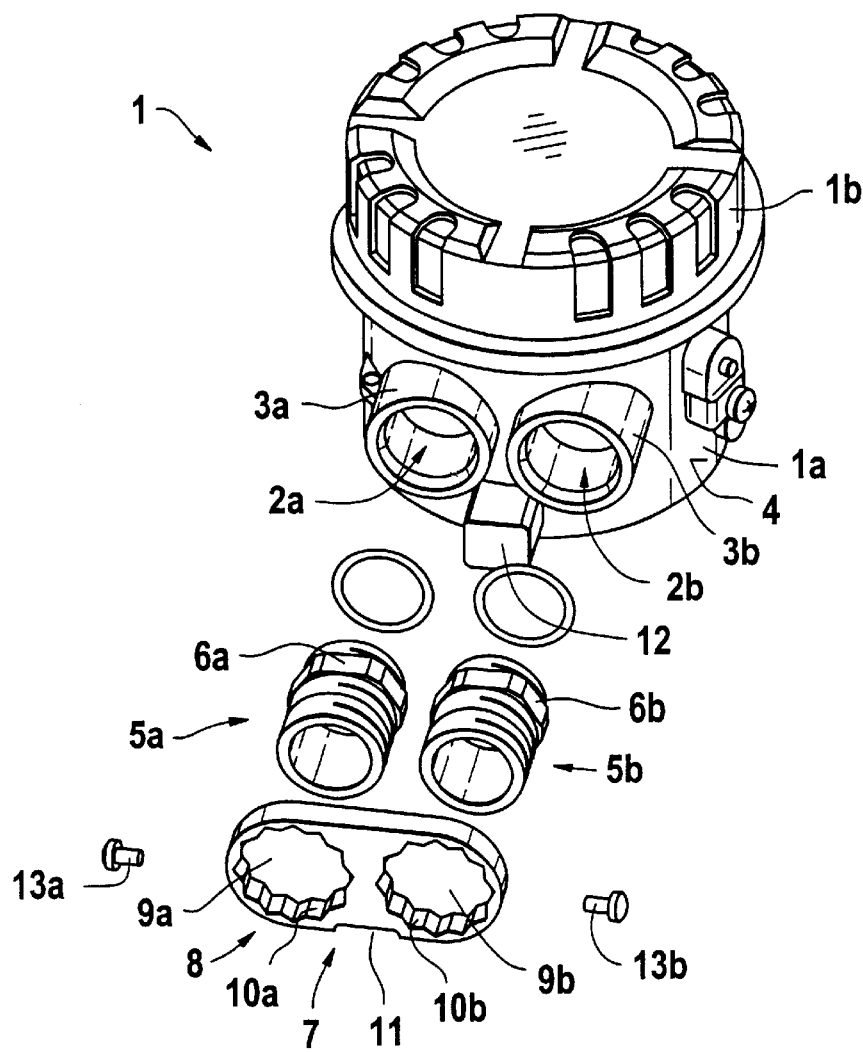

In FIGS. 1a and 1b, a substantially cylindrical housing 1 of any desired item of equipment is reproduced in a perspective representation. The housing 1, preferably produced from a suitable plastic, comprises a basic housing body 1a, which is closed by a housing cover 1b. Provided in a usually relatively thin wall of the basic housing body 1b, as represented in FIGS. 1a and 1b, are two bushings 2a and 2b, which permit access to the interior of the housing 1. In the case of the housing 1 represented by way of example, short, hollow-cylindrical connection pieces 3a and 3b are formed on in a way known per se laterally on the basic body 1a, to be more precise in the circumferential surface 4 of the latter, surrounding the bushings 2a and 2b and respectively form with the latter access to the housing interior for supply and signal lines of the equipment (not represented). The connection pieces 3a and 3b preferably compensate by their shape for the rounding of the circumferential surface 4, represented here by way of example, in such a way that their annular surfaces (see FIG. 1b) facing away from the circumferential surface 4 lie in one plane.

The bushings 2 typically have an internal thread, with the result that adapters, preferably threaded adapters 5a, 5b with hexagonal external shapes 6a and 6b, for example of metal, can be screwed in there. In FIG. 1b, a housing 1 is represented before the screwing in of the adapters 5a, 5b. FIG. 1a shows the housing with screwed-in adapters 5a, 5b.

A fastening means 7 according to the invention is fitted onto the threaded adapters 5a, 5b or their hexagonal external shape 6a, 6b (see in this respect also FIG. 2 and FIG. 3) and fastened thereto in a suitable way, for example by means of weld points, by grooved pins or grooved drive studs 13a, 13b, as represented in FIG. 1a. Cable, sheath or conduit connections for the leading in and routing of supply and signal lines or cables can be screwed into the threaded adapters 5a, 5b in a known manner.

According to FIGS. 2 and 3, the fastening means 7 comprises a sheet-like base plate 8, which is preferably produced from a metal sheet, preferably of stainless steel. Provided in it are two openings 9a, 9b, the spacing apart of which corresponds exactly to that of the threaded adapters 5a, 5b on the housing 1. The inner surfaces 10a, 10b of the openings 9a, 9b are shaped in such a way that, when the fastening means 7 is fitted onto the threaded adapters 5a, 5b, a positive connection is established at the latter or at their hexagonal external shape 6a, 6b. As FIGS. 2 and 3 illustrate, the inner surfaces 10a, 10b of the openings 9a, 9b are designed as a double hexagon, that is a dodecagon, which has advantages when aligning the threaded adapters 5a, 5b and fitting on the fastening means 7, as will become clear further below. However, it is quite possible to form the openings 9a, 9b or their inner surfaces 10a, 10b in a different shape, for example as a simple hexagon (see FIG. 4) or else as a triangle. For the invention it is important that a positive engagement comes about between the fastening means 7 and the adapters, in the case represented threaded adapters 5a, 5b, in not being absolutely necessary for the positive engagement to be established at all six corners of the hexagonal external shape 6 of the threaded adapters 5a, 5b.

During assembly, first of all the threaded adapters 5a, 5b are screwed into the bushings 2a, 2b or into the connection pieces 3a, 3b (see FIG. 1b) and a small torque of, for example, about 1 Nm is sufficient for tightening them. Then, they are turned slightly further and, as a result, aligned in such a way that the fastening means 7 can be fitted positively onto both threaded adapters 5a, 5b. The particular advantage which arises if the inner surfaces 10a, 10b of the openings 9a, 9b are designed as a double hexagon is also evident during this stage. This is so since, for the mutual alignment of the threaded adapters 5a, 5b, the latter must then be turned only by a maximum of 30° in order to be able to fit the fastening means 7 onto both threaded adapters 5a, 5b. In the case of a simple hexagon on the inner surface 10 of the openings 9a, 9b, a turn of up to 60° would be necessary. In addition, the fastening means 7 itself can be used as a tool for the aligning of the threaded adapters 5a, 5b. In order to prevent the fastening means 7 from falling off the connection pieces 3a, 3b, are secured on the threaded adapters 5a, 5b by the grooved drive studs 13a, 13b represented in FIG. 1b. It goes without saying that other possibilities for securement, such as weld points, grooved pins for example, are also conceivable for this purpose.

During subsequent connecting, that is screwing in and tightening, of line connections into the threaded adapters 5a, 5b, the fastening means 7 prevents by its connection of the two threaded adapters 5a, 5b to one another overstressing of the latter and consequently also tearing out of the threaded adapters 5a, 5b from the connection pieces 3a, 3b or the bushings 2a, 2b. The torque applied during screwing in and tightening of a line connection no longer has to be absorbed by the individual threaded adapter 5a or 5b and its screw connection with connection piece 3a or 3b or with the bushing 2a or 2b, but is distributed by the fastening means 7 respectively over the two threaded adapters 5a, 5b. A lever action of the fastening means 7, determined by the spacing between its openings 9a, 9b, converts the screwing-in torque acting on an adapter into a bending load, which can be absorbed better and is therefore more favorable. An interesting effect is that torques acting on the two threaded adapters 5a, 5b in respectively opposite directions fully or partially compensate for one another.

A high permissible bending load on the threaded adapters 5a, 5b is also desirable for normal operation of the equipment. If lines for an item of equipment are brought up through conduits for example, which are screwed into the threaded adapters 5a, 5b, the long lever arm of the conduits on the threaded adapters 5a, 5b causes considerable bending forces to act, which are then distributed by the fastening means 7 between the two threaded adapters 5a or 5b. Consequently, in a so-called "bending test", already mentioned, for a housing with two ¾" threaded adapters 5a, 5b and with the fastening means 7, it was possible for a bending torque of 34 Nm and greater to be achieved, whereas in a corresponding test without the fastening means 7 only a bending torque of 17 Nm was achieved. If the arrangement is set up in such a way that the possible bending torques on the two threaded adapters 5a, 5b act in opposite directions, they can fully or partially cancel one another out.

In the embodiment according to FIGS. 1b, 2 and 3, the fastening means 7 also has a recess 11 on its outer periphery. This recess is adapted in its shape to a projection 12 on the housing 1, in which there is accommodated, for example, a moisture filter, intended to counteract the formation of condensation in the interior of the housing 1.

The projection 12 projects beyond the circumferential surface 4 of the housing 1 in such a way that the fastening means 7 bears with its recess 11 positively against said projection, whereby the desired action of the fastening means 7 with respect to the distribution of torques acting on the individual threaded adapters 5a, 5b is improved still further.

The fastening means 7 also offers a further advantage if there are connected to the threaded adapters 5a, 5b of the plastic housing metallic conduits, in which electrical supply lines and signal lines are led. Since differences in electric potential can repeatedly occur at such conduits, and are difficult to compensate specifically in the case of plastic housings, this may lead to a possible safety problem. If, however, the fastening means 7 comprises a metal sheet, as described, it brings about a potential equalization as a result of its positive contact with the metallic threaded adapters 5a, 5b and thus also the conduits connected there. The electrical safety for the equipment can be further enhanced by the fastening means 7 being grounded or connected to an electrical ground connection.

However, the invention is not restricted to the embodiment described above. Consequently, the fastening means 7 may, for example, also be manufactured from glass-fiber-reinforced plastic. In any event, the fastening means 7 can be adapted in shape and size in a wide variety of ways to the respective requirements and applications, such as the number and arrangement of adapters or bushings of the desired equipment or applications. FIGS. 4 to 10 show by way of example further variation possibilities of many that are conceivable.

FIGS. 4 and 5 show another fastening means 17 according to the invention for a housing with a total of four connection possibilities for the leading in and/or through of lines, it having been assumed here merely by way of example that these four connection possibilities at the housing concerned are not all located on one line and not even on a single plane (which of course would also be possible), but instead two of the openings 19a, 19b or 19c, 19d of the fastening means 17 are respectively to be located on two mutually offset planes, in adaptation to the shape of the housing, and one connection possibility is also offset by 90° with respect to the other. The base plate of the fastening means 17 is designed as an angled plate 18 with one longer leg and one shorter leg, which are at right angles with respect to one another. Consequently, for example, three of the openings 19a, 19c, 19d may lie on one line and a fourth opening 19b may be arranged offset by 90° thereto. As becomes clear in particular from the sectional view according to FIG. 5, the longer leg has at the transition to the shorter leg an angled-away portion 21, which makes the angled plate 18 follow an assumed shape of a housing, with the result that good bearing contact and support of the fastening means 17 on a correspondingly shaped housing is ensured and two of the openings 19a and 19b or 19c and 19d are respectively located in two different planes. The inner surfaces 20a, 20b, 20, 20c of the openings 19a, 19b, 19c, 19d of the fastening means 17 are designed in this embodiment by way of example as a simple hexagon.

A further embodiment of a fastening means 27 according to the invention is represented in FIGS. 6 and 7, for use on a housing with three connection possibilities, which are arranged with respectively the same spacing apart. Here, a sheet-like base plate 28 has the shape of an equilateral triangle with rounded-off corners, and in each of these corners there is respectively located an opening 29a, 29b, 29c, by which the fastening means 27 can, as already described above, be fitted onto threaded adapters on a housing (not represented here, but similar to those of the illustrations of FIGS. 1a and 1b). Inner surfaces 30a, 30b, 30c of the openings 19a, 19b, 19c are designed here by way of example as a double hexagon or dodecagon.

Figure 8:
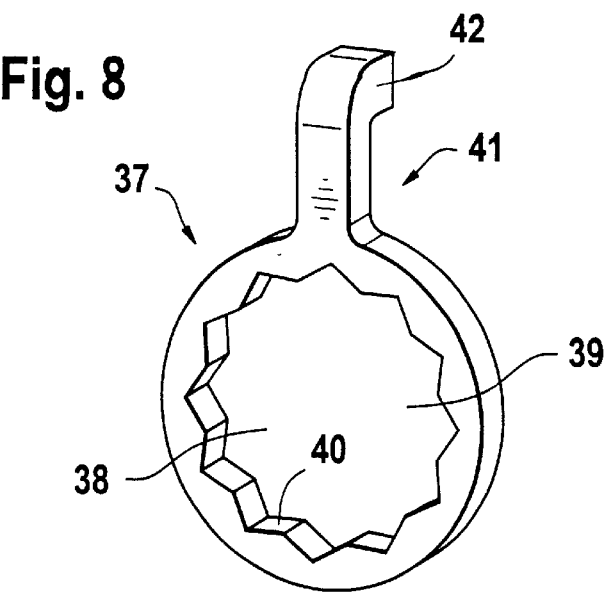
FIG. 8 shows a perspective representation of a fourth embodiment of the fastening means according to the invention.
Figure 9:
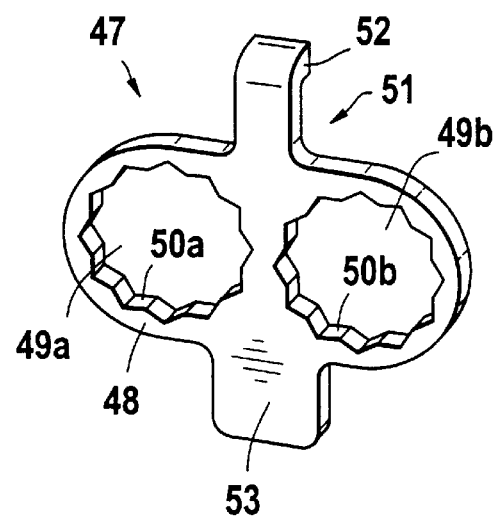
FIG. 9 shows a perspective representation of a fifth embodiment of the fastening means according to the invention.

Further embodiments of the invention are represented in FIGS. 8 and 9. In the case of the representation according to FIG. 8, a fastening means 37 has in its base plate 38 a single opening 39, the inner surface 40 of which is in turn designed by way of example as a dodecagon. In the case of the subject matter of FIG. 9, a base plate 48 of a fastening means 47 has two openings 49a, 49b, the inner surfaces 50a and 50b of which are likewise designed by way of example as a double hexagon or dodecagon.

Figure 10:
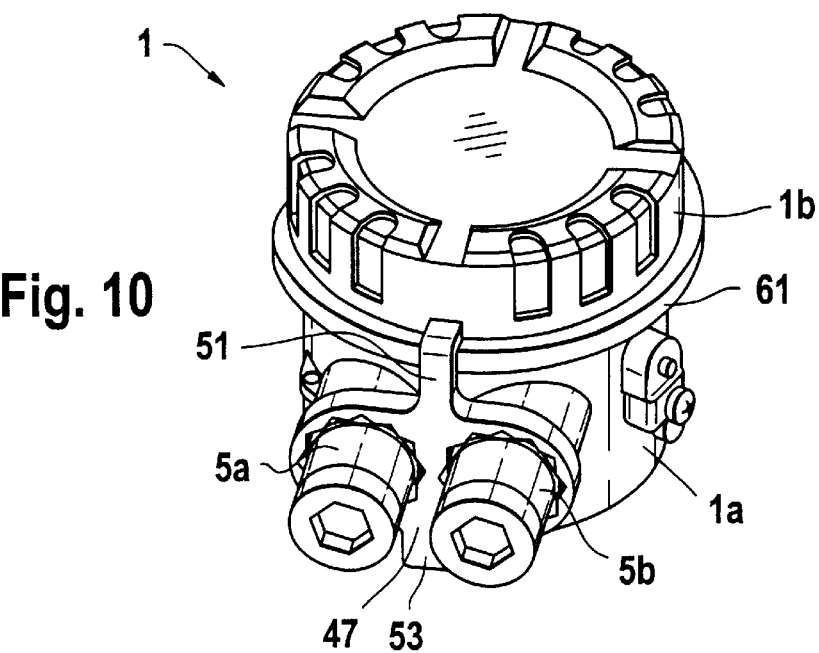
FIG. 10 shows a housing in perspective view with the fastening means according to FIG. 9.

In these embodiments of the invention, however, there are additionally provided securing or bracing elements 41 or 51, which are respectively formed by a cranked projection 42 or 52 of the base plate 38 or 48. As FIG. 10 illustrates by the example of the housing 1, already represented in FIG. 1, with a fastening means 47 (according to FIG. 9) fitted onto the threaded adapters 5a, 5b, the securing and bracing element 51 of said means grips with its cranked projection 52 around a collar 67 of the housing cover 1b. As a result, the securing and bracing element 51 prevents undesired detachment of the housing cover 66 from the housing 1 in a simple way. In addition, the securing and bracing element 51 prevents turning or twisting of the fastening means 47 and additionally supports threaded adapters 5a, 5b on the housing 1, with the desired result that relatively high torques acting on the threaded adapters 5a, 5b do not cause any adverse effects. It is clear to a person skilled in the art that, and how, he can design such a securing and bracing element also in the case of the other fastening means 7, 17 and 27 mentioned above (FIGS. 2 to 7).

The last effect mentioned above is particularly important in the case of the fastening means 37 according to FIG. 8. Since the latter is designed for housings with only a single adapter 5a or 5b, the supporting and bracing with respect to a second adapter (see in this respect FIG. 1a), not present here, is undertaken by the securing and bracing element 41. The cranked projection 41 of the latter grips in a similar way, as represented by the example of the fastening means 47 in FIG. 10, around the rim 61 of the housing cover 1b and braces the fastening means 37 with respect to the housing 1. Like the securing and bracing element 51 according to FIG. 10, the securing and bracing element 41 also prevents undesired detachment of the housing cover 66 from the housing 1 in a simple way.

Other configurations of such a securing and bracing element 41 for a fastening means 37 can easily be imagined by a person skilled in the art. Consequently, for example, the cranked projection 41 may be provided at positions other than the represented position of the fastening means and interact with some other edge correspondingly shaped on the housing. The securing and bracing element 41 may, for example, be shaped in such a way that it engages in an eye often present on the circumferential surface of a housing, for example for a lead seal, and thus braces the fastening means 37, and consequently an adapter enclosed by it, with respect to the housing. In an entirely different case, the fastening means 37 may also be provided with a recess similar to the recess 11 of the fastening means 7 represented in FIGS. 1a, 1b, 2 and 3, which recess is then supported on a corresponding projection or edge of the housing and braced there.

Another advantageous embodiment of the fastening means 47 becomes clear from the representation of FIG. 9. In addition to the effect mentioned of the securing and bracing element 51 (see in this respect FIG. 10), a part protruding from the housing can be covered and protected by a further, additional formed-on portion of the fastening means 47, which in FIGS. 9 and 10 is represented as a covering plate 53. Consequently, for example, the covering plate 53 may serve the purpose of protecting the moisture filter in the projection 12 of the housing 1, mentioned in connection with the description of the housing 1 according to FIG. 1. At the same time, when bearing against and supporting a suitable edge or shoulder of the housing 1, the covering plate 53 may of course also enhance the advantageous effect of the fastening means 47 with respect to the torques permissible for the adapters.

Particularly if the fastening means is intended to connect a multiplicity of connection possibilities of a housing positively to one another, a further configuration of the invention that has not previously been mentioned or represented here may be used. Consequently, for example, the fastening means 7, 17, 27, 37 or 47 may be configured such that it is elongated in such a way that it is made to extend on both sides beyond the connection points on the housing in such a way that it is supported with a broad surface on the housing and additionally dissipates forces acting on the adapters.

The manufacture of the mentioned fastening means 7, 17, 27, 37, 47 is extremely simple and is inexpensive even in the case of small numbers. They can be produced in various shapes and as a metal configuration from a sheet, for example by punching or laser cutting; no special tools are required.

What is claimed is:

1. A fastener for a housing having an interior for accommodating an item of equipment, at least two bushings which permit access into the housing interior for lines, such as for example signal lines, supply lines or conduits or the like, and adapters for connecting the lines to the bushings; the fastener comprising a base plate with at least two openings which correspond in shape and arrangement to the adapters and the inner surfaces of which are shaped in such a way that the base plate fits positively onto the adapters and the latter are positively braced with respect to one another.

2. A fastener for a housing having an interior for accommodating an item of equipment, at least one bushing which permits access into the housing interior for a line, such as for example a signal line, a supply line or a conduit or the like, and at least one adapter for connecting the line to the bushing; the fastener comprising a base plate with at least one opening, which corresponds in shape and arrangement to the adapter and the inner surface of which is shaped in such a way that the base plate fits positively onto the adapter and the latter is positively braced with respect to the housing by means of at least one securing or bracing element.

3. A fastener according to claim 1, in which the adapters have a polygonal external shape and the inner surfaces of the openings in the base plate are designed as a triangular, hexagonal or dodecagonal shape fitting positively thereon.

4. A fastener according to claim 1, in which at least two of the openings in the base plate lie in a row on a common line.

5. A fastener according to claim 1, in which the base plate is an angled plate in which more than two openings are provided, which lie on two lines running at an angle with respect to one another.

6. A fastener according to claim 1, in which the base plate has for adaptation to a contour of a housing wall at least one angled-away portion and the at least two openings lie in at least two different planes.

7. A fastener according to claim 1, in which the base plate has the shape of an equilateral triangle with rounded-off corners and an opening lies in each corner.

8. A fastener according to claim 1, in which the base plate comprises a metal sheet.

9. A fastener according to claim 1, in which the base plate consists of a glass-fiber-reinforced plastic.

10. A fastener according to claim 1, in which the base plate is formed to include a recess into which a corresponding projection of the housing acts in an engaging or positive manner.

11. A fastener according to claim 1, further comprising at least one cranked projection which is formed onto the base plate and interacts with a corresponding abutment of the housing.

12. A fastener according to claim 3, wherein the adapters are screwed into the bushings.

13. A fastener according to claim 5, wherein the openings in the base plate lie on two lines running at a right angle with respect to one another.

14. A fastener according to claim 8, wherein the base plate is made of stainless steel.

15. A fastener according to claim 2, in which the at least one adapter has a polygonal external shape and the inner surface of the at least one opening the base plate is designed as a triangular, hexagonal or dodecagonal shape fitting positively thereon.

16. A fastener according to claim 15, wherein the at least one adapter is screwed into the at least one bushing.

17. A fastener according to claim 2, in which the base plate is formed to include at least two openings which lie in a row on a common line.

18. A fastener according to claim 3, in which the base plate is formed to include at least two openings which lie in a row on a common line.

19. A fastener according to claim 2, in which the base plate is an angled plate in which more than two openings are provided, which lie on two lines running at an angle with respect to one another.

20. A fastener according to claim 19, wherein the openings lie on two lines running at a right angle with respect to one another.

21. A fastener according to claim 3, in which the base plate is an angled plate in which more than two openings are provided, which lie on two lines running at an angle with respect to one another.

22. A fastener according to claim 2, in which the base plate has for adaptation to a contour of a housing wall at least one angled-away portion and the base plate includes at least two openings which lie in at least two different planes.

23. A fastener according to claim 3, in which the base plate has for adaptation to a contour of a housing wall at least one angled-away portion and the at least two openings lie in at least two different planes.

24. A fastener according to claim 5, in which the angled plate has for adaptation to a contour of a housing wall at least one angled-away portion and the at least two openings lie in at least two different planes.

25. A fastener according to claim 2, in which the base plate has the shape of an equilateral triangle with rounded-off corners and an opening lies in each corner.

26. A fastener according to claim 3, in which the base plate has the shape of an equilateral triangle with rounded-off corners and an opening lies in each corner.

27. A fastener according to claim 5, in which the base plate has the shape of an equilateral triangle with rounded-off corners and an opening lies in each corner.

28. A fastener according to claim 2, in which the base plate comprises a metal sheet.

29. A fastener according to claim 28, wherein the base plate is made of stainless steel.

30. A fastener according to claim 3, in which the base plate comprises a metal sheet.

31. A fastener according to claim 4, in which the base plate comprises a metal sheet.

32. A fastener according to claim 5, in which the angled plate comprises a metal sheet.

33. A fastener according to claim 6, in which the base plate comprises a metal sheet.

34. A fastener according to claim 7, in which the base plate comprises a metal sheet.

35. A fastener according to claim 2, in which the base plate consists of a glass-fiber-reinforced plastic.

36. A fastener according to claim 3, in which the base plate consists of a glass-fiber-reinforced plastic.

37. A fastener according to claim 4, in which the base plate consists of a glass-fiber-reinforced plastic.

38. A fastener according to claim 5, in which the angled plate consists of a glass-fiber-reinforced plastic.

39. A fastener according to claim 6, in which the base plate consists of a glass-fiber-reinforced plastic.

40. A fastener according to claim 2, in which the at least one securing or bracing element is a specially shaped recess of the base plate into which a corresponding projection of the housing acts in an engaging or positive manner.

41. A fastener according to claim 3, in which the base plate is formed to include a recess into which a corresponding projection of the housing acts in an engaging or positive manner.

42. A fastener according to claim 4, in which the base plate is formed to include a recess into which a corresponding projection of the housing acts in an engaging or positive manner.

43. A fastener according to claim 2, in which the securing or bracing element is at least one cranked projection which is formed onto the base plate and interacts with a corresponding abutment of the housing.

44. A fastener according to claim 3, further comprising at least one cranked projection which is formed onto the base plate and interacts with a corresponding abutment of the housing.

45. A fastening mechanism for a housing having at least one bushing which permits access into an interior region of the housing, the at least one bushing being configured to receive at least one of a signal line, a supply line and a conduit for an item of equipment located in the interior region of the housing, the at least one of the signal line, the supply line and the conduit being connected to the at least one bushing by at least one adapter, the fastening mechanism comprising a base plate formed to include at least one opening which corresponds in shape and arrangement to a shape of the adapter, the at least one opening being formed by an inner surface of the base plate which is configured to fit onto the adapter, the base plate being coupled to the housing by at least one securing element.

46. The fastening mechanism according to claim 45, wherein the housing has at least two bushings which permit access into the interior region of the housing and at least two adapters, the base plate being formed to include at least two openings which correspond in shape and arrangement to the shapes of the at least two adapters.

47. The fastening mechanism according to claim 45, in which the at least one adapter has a polygonal external shape and the inner surface defining the at least opening in the base plate has one of a triangular shape, a hexagonal shape, and a dodecagonal shape.

48. The fastening mechanism according to claim 46, in which the base plate is formed to include at least two openings configured to lie in a row on a common line.

49. The fastening mechanism according to claim 46, in which the base plate is an angled plate in which more than two openings are provided, the openings being configured to lie on two lines aligned at an angle with respect to one another.

50. The fastening mechanism according to claim 46, in which the base plate includes at least one angled-away portion and at least two openings which lie in at least two different planes.

51. The fastening mechanism according to claim 46, in which the base plate has the shape of an equilateral triangle having three corners and wherein an opening is formed in each corner.

52. The fastening mechanism according to claim 45, in which the base plate comprises a metal sheet.

53. The fastening mechanism according to claim 45, in which the base plate comprises a glass-fiber-reinforced plastic.

54. The fastening mechanism according to claim 45, in which the securing element is a recess formed in the base plate, the recess being configured to receive a corresponding projection of the housing.

55. The fastening mechanism according to claim 45, further comprising at least one cranked projection which is formed on the base plate and which interacts with a corresponding abutment of the housing.

* * * * *